United States Patent
Crow

[11] 3,924,201
[45] Dec. 2, 1975

[54] LASER APPARATUS EMPLOYING MECHANICAL STABILIZATION MEANS

[75] Inventor: Thomas G. Crow, Orlando, Fla.

[73] Assignee: International Laser Systems, Inc., Orlando, Fla.

[22] Filed: July 10, 1974

[21] Appl. No.: 487,121

Related U.S. Application Data

[63] Continuation-in-part of Ser. No. 293,842, Oct. 2, 1972, abandoned.

[52] U.S. Cl............. 331/94.5 C; 350/147; 350/150
[51] Int. Cl.²....................... H01S 3/08; H01S 3/081
[58] Field of Search ........... 331/94.5; 350/106, 147, 350/150

[56] References Cited
UNITED STATES PATENTS

| 2,571,937 | 10/1951 | Peck .................................. 356/106 |
| 3,373,376 | 3/1968 | Clark et al. ........................ 331/94.5 |

FOREIGN PATENTS OR APPLICATIONS

| 1,439,416 | 11/1968 | Germany ........................... 331/94.5 |

OTHER PUBLICATIONS

Karube et al., Japanese Journal of Applied Physics, Vol. 6, No. 3, March, 1967, pp. 364-374.
Mack, IEEE J. of Quantum Electronics, Vol. 4, No. 12, Dec., 1968, pp. 1015-1016.

*Primary Examiner*—Robert J. Webster
*Attorney, Agent, or Firm*—Duckworth, Hobby & Allen

[57] ABSTRACT

A laser includes a lasing medium and two Porro prism end reflectors with the roofline of each prism being at an angle between about 5°-85° with respect to the plane of polarization and optically perpendicular to each other, to provide mechanical stability. A beam splitter is provided to direct a portion of the energy out of the system, the output power being determined by the angle of rotation of the Porros.

13 Claims, 6 Drawing Figures

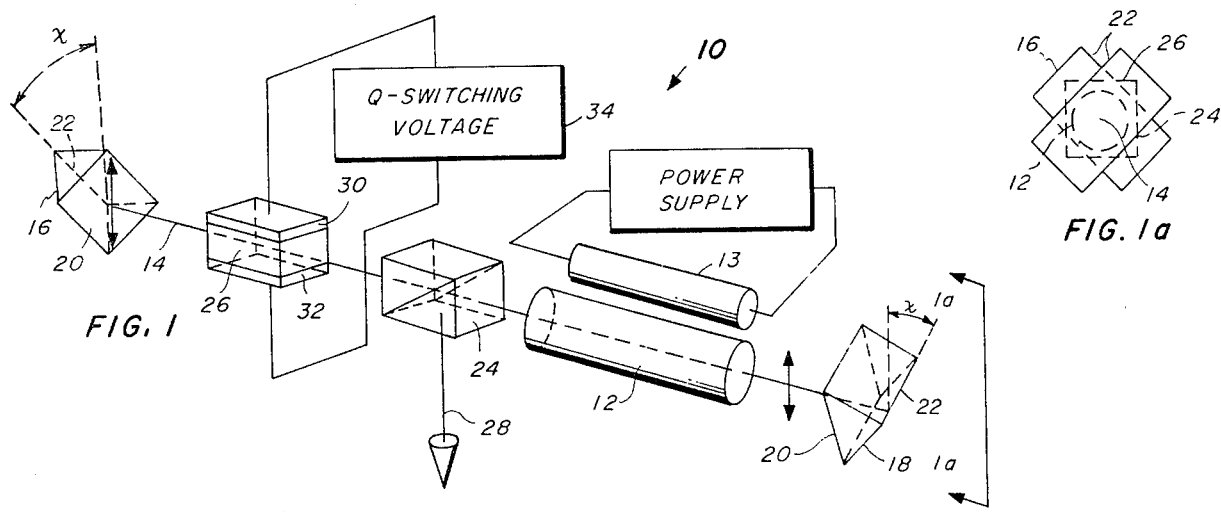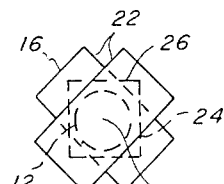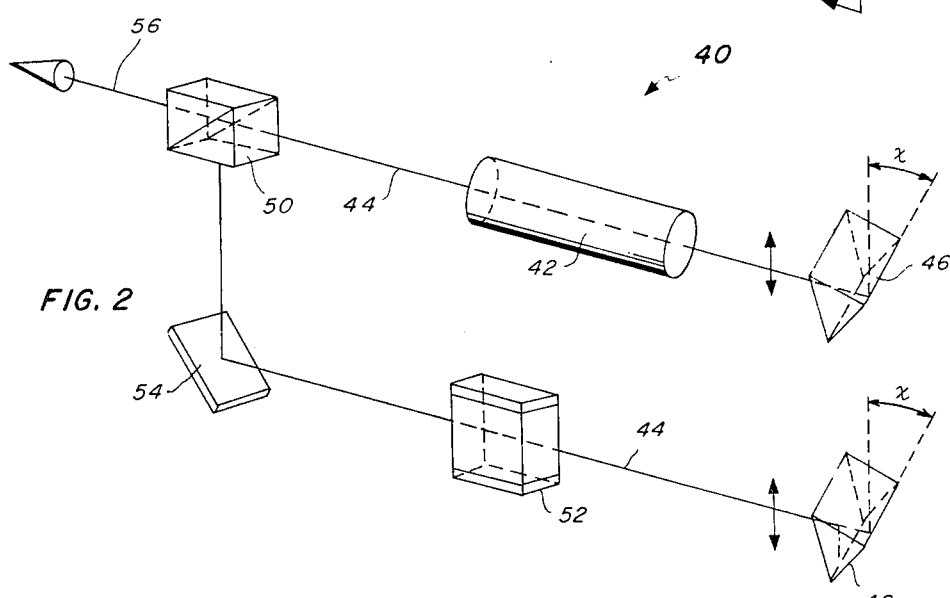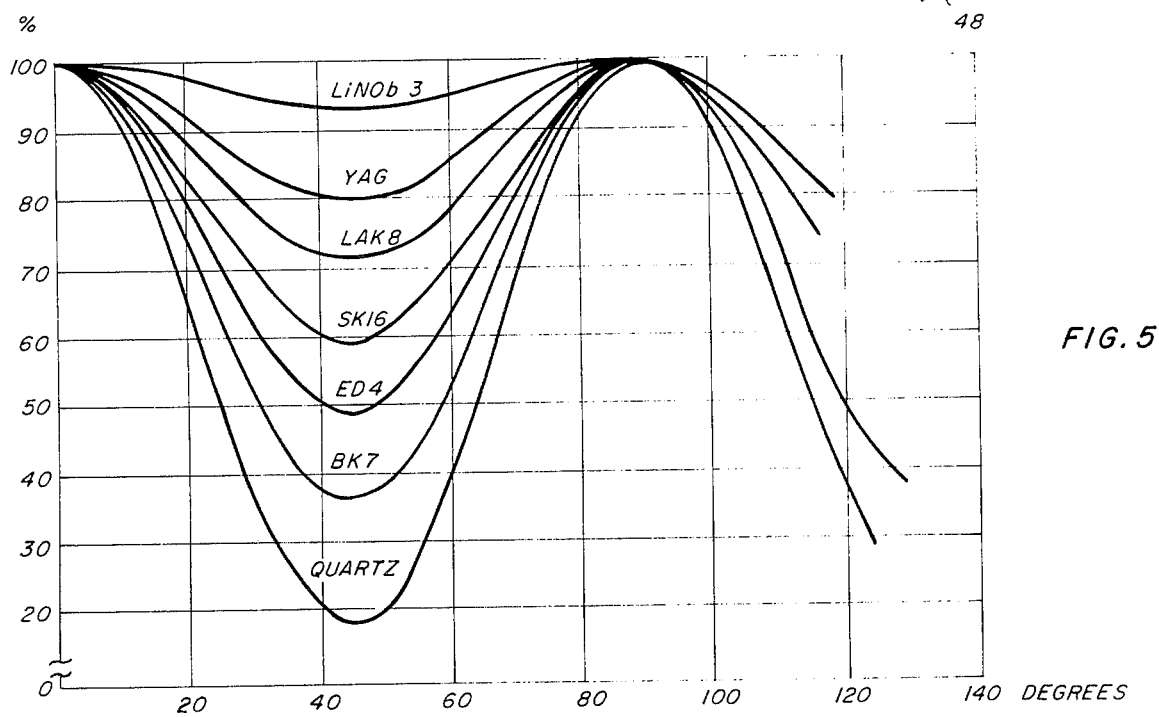

LASER APPARATUS EMPLOYING MECHANICAL STABILIZATION MEANS

This application is a Continuation-In-part of an application filed Oct. 2, 1972, Ser. No. 293,842 now abandoned.

BACKGROUND OF THE INVENTION

The present invention relates to lasers and in particular to apparatus and methods for providing mechanical stability for laser systems.

DESCRIPTION OF THE PRIOR ART

Lasers are now established in the art for generating coherent electromagnetic radiation in the optical frequency range. The operation of a laser is based upon the principle that the atomic systems represented by the atoms of the laser material can exist in any of a series of discreet energy levels or states, the systems absorbing energy in the optical frequency range by going to a higher state and emitting energy when going to a lower state. When ruby is used as a laser material, three energy levels are utilized. The atomic systems are raised from the lower, or ground level, to the higher of the three levels by irradiation from the strong light source which need not be coherent but preferably has a high concentration of energy in the absorbing wavelengths. A radiationless transition then occurs from the higher state to an intermediate or metastable state. This is followed by a transition with photon emission from the intermediate state back to the ground state. It is the last transition that is of interest since this transition is the source of the coherent light energy produced by the laser.

The operation of raising the energy level of the laser material to produce the desired photon emission is referred to in the art as "pumping" and when more atoms reach an excited metastable state and remain in a lower energy state, a "population inversion" is said to exist.

The active laser medium is made optically resonant by placing reflectors at either end thereof. Various types of reflectors have been used in the prior art. Silver and dielectric coated reflector mirrors, such as that described in U.S. Pat. No. 3,418,476 to Muller et al, are widely employed. However, such reflecting mirrors are subject to very tight alignment tolerances, causing operation of the laser to be frequently disrupted by jolting, thermal cycling or any activity which causes a slight misalignment of the reflecting mirrors. Typically, a misalignment of 0.3 milliradian can prevent operation of laser systems employing reflecting mirrors, and such systems are thus severely limited in terms of mechanical stability. Concave mirrors are frequently used with such reflecting mirror systems in order to relax this mechanical limitation. However, concave mirrors greatly increase beam divergence and can be detrimental to Q-switches, which are described below in greater detail.

In the March 1967 issue of the Japanese Journal of Applied Physics, (Volume 6, No. 3, page 364) Karube et al disclose an optical laser employing corner cube prisms to achieve relative insensitivity to mechanical misalignment. As taught by Karube et al, this mechanical insensitivity is achieved, in one example, shown at FIG. 1c on page 365, by employing a laser rod having Brewster-angled faces and utilizing two corner cube reflectors which are tilted against each respective Brewster face. It is clear from the teachings of this article that the alignment insensitivity of the Karube et al arrangement extends only to an axis which is parallel to the prism apex. This is shown in FIG. 11, page 372, where the authors illustrate that laser power falls off completely when the corner cube prism is rotated out of the plane of polarization at angles as small as 70 minutes.

Porro prisms have also been employed as end reflectors in laser systems. See for example U.S. Pat. Nos. 3,464,026 to Woodbury et al; 3,327,243 to Stickley; and 3,373,376 to Clark et al. A Porro prism is a 45°-45°-90° prism which provides total reflection of light incident to a face opposite a 45° angle when the light is sufficiently parallel such that all of the light strikes the reflecting face outside the critical angle. Laser energy is coherent, and therefore light emitted by a lasing medium can be totally reflected by a Porro prism. Because a Porro prism reflects laser energy through two 90° angles, there is a 180° angular change between the reflected energy and the energy entering the prism. Examples of other optical and laser systems employing Porro prisms include U.S. Pat. Nos. 2,571,937 to Peck and 3,460,046 to Arnaud. Arnaud discloses the use of Porro prism end reflectors twisted at an angle of 87.5° to achieve degeneracy in a laser system.

Another important aspect of laser operation is the degree of resonance (referred to by a quality factor "Q") of the laser energy in the system. In a resonant system, the resonant cavity of the laser picks up some of the light that results from the fluoresence or the spontaneous transition with photon emission from the metastable state back to the ground state, and resonant modes will be established which further stimulates emission. As the pumping means raises the population of atoms in the excited state to inversion, stimulated emission proceeds to deplete the population to below that of the spontaneous decay threshold. One method of exceeding the threshold of population inversion is to interrupt the resonant cavity until pumping has greatly exceeded inversion and then suddenly restoring the Q or resonant cavity. If stimulated emission is retarded in this way until a very high level of inversion is reached, a very narrow pulse of high power, referred to as a "giant" pulse, can be generated. This method of controlling Q is referred to as "Q-switching." Q-switching can be accomplished in many ways; see, for example, U.S. Pat. No. 3,541,468 to Hammond et al and the aforementioned patent to Muller et al.

One specific type of Q-switch is referred to as a "Pocket Cell" in the laser art. A Pockels Cell comprises a crystal of a material such as lithium niobate interposed on the beam axis between the laser rod and one of the end reflectors. Metallic electrodes attached to the crystal provide means for reptitiously biasing the crystal with a modulating Q-switching voltage.

While otherwise suitable for Q-switching, Pockels Cells are frequently damaged by fluctuations in the energy density and divergence of the laser beam. This problem is especially prevalent in those types of laser systems designed to operate at different pulse repetition rates, because the beam energy density and divergence will vary for different pulse rates, assuming all other conditions remain unchanged. In some cases, non-uniformity of the energy density of the beam is also due to optical aberrations in the laser rod.

SUMMARY OF THE INVENTION

The present invention contemplates laser apparatus comprising an active lasing medium and means for producing a population inversion in the laser medium. Means are also provided for stimulating and supporting the emission of a coherent beam of radiant energy from the laser medium, and a beam splitter is provided for polarizing radiant energy along the beam into a plane of polarization and for directing a portion of the radiant energy along an output axis out of the beam splitter.

In accordance with the present invention, the stimulating and supporting means further comprises a roofline prism disposed along the beam such that the roofline thereof is at an angle with respect to the plane of polarization, which angle is substantially other than normal to, or parallel with the plane of polarization to render the laser apparatus relatively insensitive to mechanical tolerances, shock and vibration.

In a preferred embodiment, the stimulating and supporting means comprises a second roofline prism at the other end of the beam, both of the roofline prisms comprising Porro prism roofline reflectors.

In accordance with yet another aspect of the present invention, a method is provided for rendering a laser apparatus mechanically insensitive and for preselecting the output of the laser apparatus. This method contemplates the steps of disposing the two Porro prisms on opposite sides of a laser medium to stimulate and support the emission of a coherent beam of radiant energy therefrom when a population inversion is produced therein. The Porro prisms are then rotated at an angle with respect to the plane of polarization, to achieve the desired mechanical insensitivity. This angle is selected to provide the desired output from the beam splitter.

THE DRAWINGS

FIG. 1 is a perspective view illustrating one embodiment of the present invention;

FIG. 1(a) is an end view of the apparatus of FIG. 1;

FIGS. 2–4 are perspective views illustrating various other embodiments of the present invention;

FIG. 5 is a graph illustrating the variable output selectivity of laser apparatus in accordance with the present invention.

DETAILED DESCRIPTION

Figure 3:
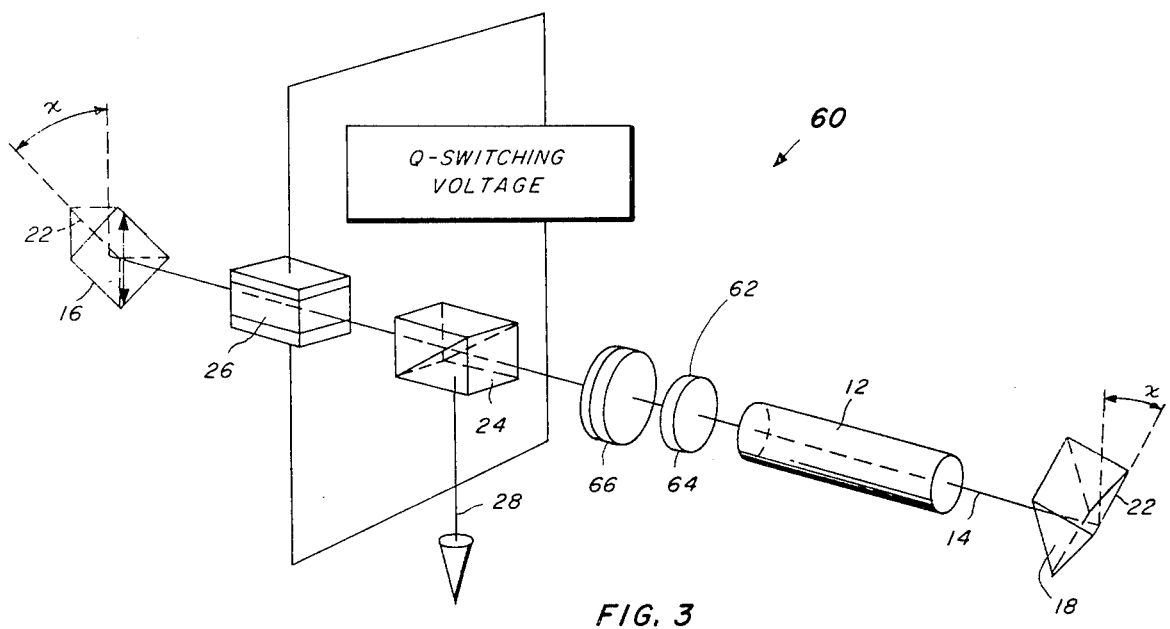

An embodiment of laser apparatus in accordance with the present invention is shown in FIG. 1 and described with reference thereto.

The laser apparatus, referred to generally as 10, comprises a solid-state laser rod 12, such as a yttrium-aluminum-garnet or a ruby rod, for example. The laser rod 12 is adapted to produce a beam of coherent light energy along a beam axis 14 when pumped to a lasing state by a flashtube 13. The power supply associated with the flashtube 13 is well known in the art and is therefore illustrated by a block diagram. A beam splitter 24 is interposed on the beam axis 14 and is adapted to polarize the light energy along the beam axis. While the beam splitter 24 may be oriented such that the plane of polarization is in any given direction, for purposes of description it is assumed that the plane of polarization of light energy along the beam axis 14 is transverse to the beam axis in the direction of the arrows shown on the beam axis in FIG. 1.

The beam splitter 24 directs a portion of the light energy along an output axis 28. While the output axis may or may not be coincident with the beam axis 14, in the embodiment of FIG. 1 the output axis 28 is not coincident with the beam axis and is arbitrarily depicted as perpendicular thereto.

A Pockels Cell Q-switch 26 is interposed on the beam axis 14 between the beam splitter 24 and one of the prisms 16, described below. The Pockels Cell 26 may comprise, for example, a lithium niobate (LiNbO$_3$) crystal having two opposed major faces which are substantially normal to the beam axis 14. The Pockels Cell 26 also includes two electrodes 30, 32 disposed on the top and bottom thereof, to apply a bias voltage across the crystals as provided by a Q-switch voltage source 34.

The apparatus 10 further includes means for stimulating and supporting laser radiation along the beam axis 14. In this example, this means comprises a pair of Porro prism end reflectors 16, 18 each of which is disposed on one end of the beam axis 14. The Porro prisms 16, 18 are adapted to support the light energy produced by the laser rod 12 along the beam axis 14 in a well known manner, as described above. As is also well known, each Porro prism 16, 18 has a 45° – 45° – 90° isosceles triangle cross section. Each prism 16, 18 is positioned on the beam axis 14 such that one face 20 opposite the 90° angle (referred to in the art as the "hypotenuse" face) is substantially perpendicular to the beam axis. In accordance with the present invention, each Porro prism 16, 18 is disposed in the laser apparatus 10 such that the roofline 22 of each prism is at an angle λ relative to the plane of polarization of the light energy emitted by the laser rod 12, which angle is substantially other than normal to, or parallel with the plane of polarization. In the embodiment of FIG. 1, the Porro prism 18 adjacent the laser rod 12 controls the reflectivity of the system 10, while the Porro prism 16 adjacent the Pockels Cell Q-switch 26 controls the voltage bias requirements for the Pockels Cell. To achieve an effective mirror reflectivity of 50 percent, it is desirable to achieve a 90° phase change in two reflections off of the internal surfaces of the Porro prisms 16, 18. Thus, the angle λ in the embodiment of FIG. 1 is approximately 45° to preserve the parallelism of light entering and exiting the Porro prisms 16, 18. In this context, "approximately" is intended to mean that the angle between the roofline 22 of each prism 16, 18 and the plane of polarization is within about ±2 milliradians of 45°. In the embodiment of FIG. 1 the two prisms 16, 18 are optically perpendicular to each other. (Note FIG. 1(a) ).

For purposes of this disclosure, the term "substantially other than normal to or parallel with said plane of polarization" is intended to mean that the angle between the roofline of each Porro prism 16, 18 and the plane of polarization 14 is at least greater than 5° and not more than 85°, in order to achieve some degree of mechanical insensitivity. Generally, the highest degree of insensitivity to mechanical tolerances, shock, vibration and the like is attained in accordance with the present invention by rotating both of the Porro prisms 16, 18 such that the rooflines thereof are 45° with respect to the plane of polarization, as described above with reference to FIG. 1. Further, the relationship between the angle of incidence $\theta_i$, the relative phase difference $\sigma$ between the light components perpendicular and parallel to the plane of incidence for each reflectivity and the index of refraction on the Porro prisms 16, 18 are expressed as follows:

$$\tan \frac{\theta}{2} = \frac{\cos \theta_i [\sin^2 \theta_i - n^2]^{1/2}}{\sin^2 \theta_i}$$

In addition, the effective reflectivity defined by the beam splitter 24 is given by the relationship:

$$R = \frac{1}{2} [1 - \cos^2 \theta]$$

For a Porro prism the angle of incidence $\theta_i$ is fixed at 22.5° for each of the two reflecting surfaces. The solution of the above expressions indicates that, to achieve 50 percent reflectivity from the beam splitter 24, the index of refraction of the prism 18 is therefore preferably about 1.56. By way of example, a prism glass identified as ED-4 having an index of refraction of about 1.56, and sold by Owens-Illinois Corporation is suitable for use as the prism 18.

However, it will be appreciated by those skilled in the art that reflectivities of greater or less than 50 percent may be needed in some applications where it is still desirable to obtain a high degree of mechanical insensitivity. In accordance with the present invention, the output can be selected by adjusting the angle between the rooflines of the Porro prisms 16, 18 and the plane of polarization, and further by proper selection of the material from which the Porro prisms are fabricated. FIG. 5 illustrates a plot of reflected output from the beam splitter 24, in percent, against the amount of Porro prism rotation (in degrees) for seven Porro prism materials, including lithium niobate, YAG, quartz, as well as the ED-4 glass mentioned above, and three other well known commercially available glasses, LAK-8, SK-16 146 and BK-7. From the graph it will be understood that the output of any laser system can be selected, while maintaining mechanical insensitivity, by proper selection of Porro prism rotation angle and the index of refraction of the material used for the Porro.

Accordingly, the laser apparatus 10 provides a high degree of mechanical stability relative to prior art devices. By employing the Porro prism end reflectors 16, 18 in which the rooflines are disposed at an angle of 45° to the plane of polarization and 90° with respect to each other, and further utilizing Porro prisms having an index of refraction as described above, it has been found that the laser apparatus is insensitive to an end reflector roll of up to ±2 milliradians. This mechanical stability represents a significant improvement relative to prior art laser apparatus employing flat mirror end reflectors, or Porro prisms without utilizing the roofline angle-index of refraction criteria set out above. In addition, the use of Porro prisms in this manner eliminates the need for employing concave mirrors to achieve mechanical stability, and thus, eliminates a major cause of undesirable beam divergence.

A second embodiment of a laser apparatus in accordance with the present invention is shown in FIG. 2 and is referred to generally as 40. The laser apparatus 40 comprises a laser rod 42; two Porro prisms 46, 48; a beam splitter 50; and a Pockels Cell Q-switch 52 all of which are essentially identical to the corresponding portion of the laser apparatus 10 in FIG. 1. While not shown in FIGS. 2-4, it will be understood that each of these embodiments also includes a flashtube for producing a population inversion in the active laser medium, as is the purpose of the flashtube 13 in FIG. 1. The above described elements of the laser apparatus 40 are disposed along a beam axis 44. In FIG. 2 that part of the light energy directed perpendicular to the beam axis 44 by the beam splitter 50 also comprises a portion of the beam axis which is reflected 90° through the Pockels Cell 52 and into the Porro prism 48 by a front surface mirror 54. The remainder of the light energy passes through the beam splitter 50 and is directed along an output axis 56 which is arbitrarily depicted in FIG. 2 as coincident to that portion of the beam axis 44 at the laser rod 42.

The plane of polarization defined by the beam splitter 50 of the light energy emitted by the laser rod 42 is shown by the arrows in FIG. 2. In this embodiment, the rooflines of the Porro prisms 46, 48 are disposed at an angle of approximately 45° relative to the plane of polarization and are mechanically parallel to each other, but again, are optically perpendicular due to effects of folding by the beam splitter and the mirror 54. The apparatus 40 also exhibits a high degree of mechanical stability in the same manner as the apparatus 10 of FIG. 1.

A third embodiment of a laser apparatus in accordance with the present invention is referred to generally as 60 and is shown in FIG. 3. The apparatus 60 is essentially identical to the apparatus 10 of FIG. 1, having a laser rod 12, a Pockels Cell Q-switch 26, a beam splitter 24 and two Porro prisms 16, 18 all of which are disposed such that the respective rooflines 22 thereof are 45° relative to the plane of polarization of light energy along the beam axis 14, and are perpendicular to each other. The beam splitter 24 directs a portion of the light energy in the beam axis 14 along an output axis 28 which is perpendicular to the beam axis.

The apparatus 60 further comprises a Galilean telescope, referred to generally as 62, interposed on the beam axis 14 between the laser rod 12 and the beam splitter 24. The Galilean telescope 62 comprises a negative element 64 and an objective lens 66. The telescope 62 is employed to control the density of the light energy along the beam axis 14, and to prevent high energy densities in the beam which might otherwise damage or destroy the Pockels Cell Q-switch 26, by compensating for the positive optical power generated in the laser rod 12 during pulse repetition operation. Further, aberrations can be introduced into one of the elements 64, 66 of the telescope 62 to offset discrepancies in the energy density along the beam axis 14 caused by known aberrations in the laser rod 12. These two objectives may be obtained in combination with the Porro prisms, and the Pockels Cell Q-switch without otherwise degrading the mechanical stability of the apparatus 10.

Figure 4:
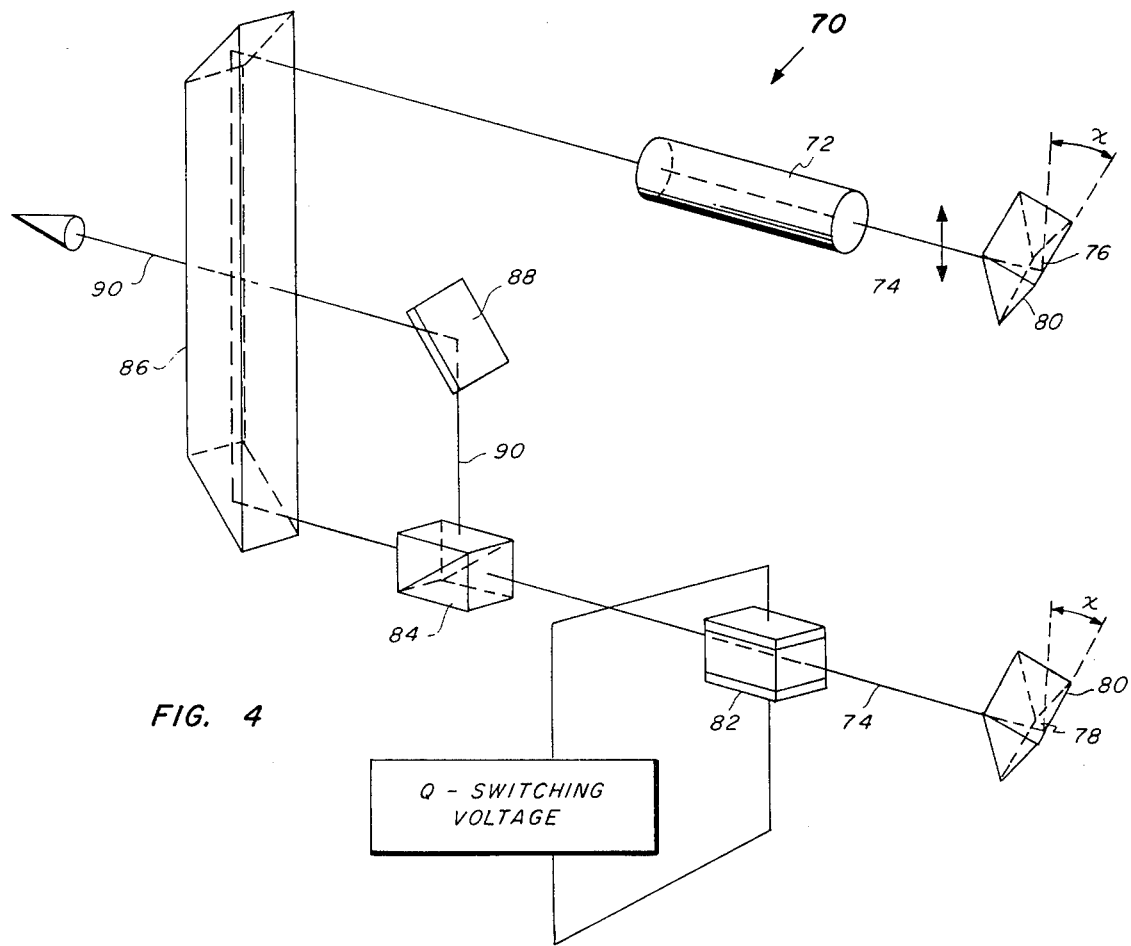

A fourth embodiment of the laser apparatus in accordance with the present invention is referred to generally as 70 in FIG. 4. The apparatus 70 comprises a laser rod 72, a Pockels Cell Q-switch 82, a beam splitter 84 and two Porro prisms 76, 78, all disposed along a beam axis 74. The apparatus 70 further comprises a trapezoidal quartz prism 86 interposed along the beam axis 74 and adapted to direct light energy along the beam through two 90° reflections such that a portion of the beam axis 74 is parallel with, and spaced from the beam axis at the laser rod 72.

The beam splitter 84 directs a portion of the light energy along an output axis 90 which is shown as perpendicular to the beam axis 14 and directed toward a laser rod 72. A front surface mirror 88 is interposed along the output axis 90 to direct light energy along the output through the hypotenuse face of the quartz prism 86.

The apparatus of FIGS. 1-4 achieves a high degree of mechanical stability for laser systems, and is usefully employed in those laser systems where mechanical stability is a critical factor, such as laser interferometers, for example. While Porro prisms have been described above, it will be understood by those skilled in the art that other roofline prisms, such as corner cube reflectors, may be usefully employed to obtain the insensitivity to mechanical tolerances, shock and vibration as is described above.

I claim:

1. Laser apparatus comprising:
an active laser medium;
means for producing a population inversion in said laser medium;
first and second roofline prisms disposed along said beam for stimulating and supporting the emission of a coherent beam of radiant energy from said laser medium;
a beam splitter for polarizing radiant energy along said beam into a plane of polarization and for directing a portion of said radiant energy along an output axis out of said beam splitter;
means for maintaining the rooflines of said prisms perpendicular to each other to render said laser apparatus relatively insensitive to mechanical tolerances, shock and vibrations;
means for positioning the rooflines fo said prisms at an angle with respect to said plane of polarization, which angle is substantially other than normal to or parallel with said plane of polarization and lying in a plane normal to the axis of said beam; and wherein
said angle is selected to provide a desired output from said beam splitter.

2. The apparatus recited in claim 1 wherein said first and second roofline prisms comprise first and second Porro prisms, respectively.

3. The apparatus recited in claim 2 further comprising phase retarding means interposed between said beam splitter and one of said Porro prisms along said beam.

4. The apparatus recited in claim 2 further comprising Q-switching means, interposed along said beam between said two Porro prisms for Q-switching said beam of radiant energy.

5. The apparatus recited in claim 4 wherein said Q-switching means comprises:
a body of crystalline material having two opposed faces intersecting and substantially normal to said beam axis; and
means for applying a bias voltage across said body.

6. The apparatus recited in claim 5 wherein said crystalline material consists essentially of lithium niobate.

7. The apparatus recited in claim 1 further comprising means disposed along said beam for controlling the energy density of radiant energy across said beam.

8. The apparatus recited in claim 7 wherein said energy density controlling means comprises a Galilean telescope interposed on said beam between said laser medium and said roofline prism.

9. The apparatus recited in claim 2 wherein said first and second Porro prisms are disposed at about 45 degrees with respect to the plane of polarization and optically perpendicular with respect to each other.

10. Laser apparatus comprising:
an active laser medium;
means for producing a population inversion in said laser medium;
means for stimulating and supporting the emission of a coherent beam of radiant energy out of said laser medium;
a beam splitter for polarizing light energy along said beam in a plane of polarization and for directing energy out of said beam splitter along an output axis;
said stimulating and supporting means comprising a pair of Porro prisms, each of said prisms disposed on an end portion of said beam for supporting laser energy therebetween, the roofline of both of said prisms being disposed approximately 45° relative to said plane of polarization, substantially parallel to each other and substantially parallel to the axis of said beam portion incident thereon;
optical beam directing means optically coupled with said prisms for forming a U-shaped resonator axis, said active medium being positioned in one leg of the U-shaped resonator path, the prisms positioned at the ends of the legs;
a Pockels Cell Q-switch interposed between said laser medium and one of said Porro prisms.

11. The laser apparatus recited in claim 10 wherein said two 90° reflecting means comprises a trapezoidal quartz prism.

12. The apparatus recited in claim 11 further comprising a mirror interposed along said output axis for directing light energy along said output axis through the hypotenuse face of said quartz prism.

13. A method for rendering laser apparatus mechanically insensitive and for preselecting the output from said laser apparatus, comprising the steps of:
providing an active laser medium;
disposing two Porro prisms on opposite sides of said laser medium to stimulate and support the emission of a coherent beam of radiant energy from laser medium when a population inversion is produced therein;
interposing a beam splitter between said laser medium and one of said Porro prisms for polarizing light energy along said beam into a plane of polarization and for directing light energy out of said beam splitter along an output axis;
rotating one of said Porro prisms at an angle with respect to said plane of polarization, which angle is substantially other than normal to or parallel with said plane of polarization and perpendicular to the axis of said beam;
positioning the other of said Porro prisms so as to have its roofline be perpendicular to the roofline of said one Porro prism to thereby render said laser apparatus rrelatively mechanically insensitive; and
selecting said angle to provide the desired output from said beam splitter.

* * * * *